United States Patent
Lo et al.

(10) Patent No.: US 6,208,719 B1
(45) Date of Patent: *Mar. 27, 2001

(54) METHOD AND APPARATUS FOR TELECOMMUNICATIONS HAVING AUTOMATIC NETWORK ADAPTATIONS AND SILENT MODE OPERATIONS

(75) Inventors: Clement C Lo, Lake Oswego; James P Axtell, Portland, both of OR (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,006

(22) Filed: Jun. 9, 1998

(51) Int. Cl.⁷ .................................................. H04M 15/00
(52) U.S. Cl. ..................... 379/112; 379/114; 379/115; 379/121; 379/123; 379/130
(58) Field of Search .................................. 379/111, 112, 379/114, 115, 116, 130, 131, 144, 118, 120, 121, 128, 140

(56) References Cited

U.S. PATENT DOCUMENTS

| 4,122,308 | | 10/1978 | Weinberger et al. ............. 179/7.1 R |
| 4,771,295 | | 9/1988 | Baker et al. ........................... 346/1.1 |
| 5,025,271 | | 6/1991 | Baker et al. ........................ 346/140 R |
| 5,425,085 | | 6/1995 | Weinberger et al. ................. 379/112 |
| 5,515,425 | * | 5/1996 | Penzias et al. ........................ 379/114 |
| 5,519,769 | | 5/1996 | Weinberger et al. ................. 379/112 |
| 5,606,602 | * | 2/1997 | Johnson et al. ...................... 379/115 |
| 5,638,433 | * | 6/1997 | Bubien, Jr. et al. .................. 379/130 |
| 5,657,378 | * | 8/1997 | Haddock et al. ................. 379/93.23 |
| 5,764,741 | * | 6/1998 | Barak ................................... 379/114 |
| 5,793,854 | * | 8/1998 | Kashepava ........................... 379/130 |
| 5,799,071 | * | 8/1998 | Azar et al. ........................... 379/113 |
| 5,799,072 | * | 8/1998 | Vulcan et al. ....................... 379/114 |
| 5,862,203 | * | 1/1999 | Wulkan et al. ...................... 379/114 |
| 5,878,122 | * | 3/1999 | White et al. ......................... 379/115 |
| 5,917,897 | * | 6/1999 | Johnson et al. ..................... 379/114 |
| 5,930,343 | * | 7/1999 | Vasquez .............................. 379/115 |

OTHER PUBLICATIONS

Egghead computer catalog, pp. 32–33, re PhoneMiser computer product, date unknown.

* cited by examiner

Primary Examiner—Curtis A. Kuntz
Assistant Examiner—Binh K. Tieu

(57) ABSTRACT

A method and apparatus for telecommunications having automatic network adaptations and silent mode operations are demonstrated. An integrated telecom device includes a programmable controller and memory adapted to receive telecommunications carrier rate information updates or system synchronization without requiring subscriber instigation or intervention procedures. Rate provider access, or subscriber programmed caller access, is recognized prior to signaling to the subscriber that an in-coming transmission is in progress and rate database updates, or other desired transmission from the programmed caller, are received automatically. In order to obtain least-cost routing of out-going transmissions, the subscriber merely inputs the destination telephone number or other destination code. In-coming transmissions from a rate provider or preselected advertising entities can be programmed for silent mode reception.

3 Claims, 5 Drawing Sheets

METHOD AND APPARATUS FOR TELECOMMUNICATIONS HAVING AUTOMATIC NETWORK ADAPTATIONS AND SILENT MODE OPERATIONS

BACKGROUND OF THE INVENTION

1. Field of the Invention

The present invention relates generally to telecommunications and, more particularly, to methods and apparatus for telecommunications having automatic network adaptations and silent downloading of data, such as out-going transmission cost rate information.

2. Description of Related Art

With the deregulation of telephone-telecommunications (hereinafter "telecom") common carriers and the escalating use of computer generated transmissions, such as electronic mail, video, and the like, over the telecom networks, the number of providers and price competition between them has created a conundrum for the end-user. Regularly, the user is challenged to change to a cheaper long distance provider for out-going transmissions (also referred to hereinafter as "calls"), yet the local service provider charges for each change in long distance service provider, making a change of long distance provider an inconvenient and costly transaction. Moreover, as is well known, out-going transmission charges, such as the common telephone call, vary according to the distance between caller and call destination, the time of day and the day of the week that the out-going transmission is placed, the duration of each call, the frequency of usage, new-user or day/month-based special rate promotional offerings, and the like.

In order to provide callers with some semblance of control, telephone call time and cost monitoring devices and stand-alone, least-cost routing devices have been created. For example, in U.S. Pat. No. 4,122,308 issued on Oct. 24, 1978 to Weinberger et al. for a Telephone Call Metenng Device, a telephone accessory device monitors the cost of a telephone call at the location of the calling telephone, continually maintaining real-time billing displays to provide an accurate indication of the cost of the call. Tie line diversion to minimize the cost of a call to a specified telephone number on a tie line network is described. In U.S. Pat. No. 5,519,769 issued May 21, 1996 to Weinberger et al. for a Method and System for Updating a Call Rating Database, a calling station, having a provided rating device including a modem, must place a call to the rate provider at a predetermined date and time when an updated database of rate parameters can be downloaded to the rating device. A purchaser of the device and provider service relies on the currently stored database to ensure that the least-cost route is chosen when making a call. In a Weinberger et al. U.S. Pat. No. 5,425,085 issued on Jun. 13, 1995 for a Least Cost Routing Device for Separate Connection into Phone Line, an apparatus is required to interconnect between the phone line coming into the facility and each phone within the facility; the apparatus routes telephone calls along a least-cost route originating therefrom using the database describe in co-filed U.S. Pat. No. 5,519,769, supra. A commercial product known as the "PhoneMiser™" by MediaCom company and commercially available through Egghead™ Computer stores appears to implement the Weinberger scheme in a computer/telephone operating environment.

There is a need for a telecommunication apparatus and method of operation being self-sufficient, automatically attuned to least cost routing, and providing advanced automated features that do not require user implemented processes.

SUMMARY OF THE INVENTION

In its basic aspects, the present invention provides a method for updating and using information regarding telecommunication transmission network system parameters in a telecommunications network system having a plurality of individual telecommunications devices connected to a plurality of carriers forming a telecommunications network. Each of the devices is capable of storing and using system parameter information, including a database for determining out-going transmission cost rates for each of the carriers based on time/day/date information for the out-going transmission. The method includes the steps of:

determining at a central telecommunications apparatus which of the devices connected to the network have a database affected by system parameter information changes;

from said central telecommunications apparatus, establishing connection from the apparatus only to specific devices having a database affected by said system parameter information changes;

transmitting over each established connection to each database, the system parameter information changes affecting the specific device connected to the central telecommunications apparatus; and using the database when placing out-going telecommunication transmissions from the device such that most recent parameter information is used in placing an outgoing telecommunication transmission.

Another basic aspect of the present invention provides a telecommunications system including: a telecommunications network including a plurality of carriers connected to a plurality of subscriber telecommunications devices; each of said devices including mechanisms for establishing and using network system parameter information, and mechanisms for identifying in-coming transmission sources; and connected to each of the carriers, central mechanisms for controlling network system parameters, for receiving periodically changing out-going transmission rate data from each of said carriers, for determining which of the plurality of devices is affected by changing network system parameter information, for establishing contact silently with system parameter change affected devices through said mechanisms for identifying in-coming transmission sources, and for downloading to the mechanisms for establishing and using network system parameter information of a currently contacted device at least changes in system parameter information affecting the currently contacted affected device.

Another basic aspect of the present invention provides a telecommunications device including: telecom mechanisms for connecting the device to a telecommunications network having a plurality of carriers, including mechanisms for determining telecommunications source identification, and for communicating over said network; coupled to said mechanisms for connecting, receiving mechanisms for creating and using telecommunications network system parameters, including an out-going transmission rate database to establish least-cost routing among the plurality of carrier networks and for silently receiving in-coming transmissions of data and for causing database changes based upon said mechanisms for determining telecommunications source identification establishing a predetermined identification of a source of said database changes.

It is an advantage of the present invention that no ancillary equipment is required for interfacing a telecommunications device to a telecommunications network in order to implement automated networking adaptations.

It is an advantage of the present invention that it incorporates least-cost routing processes directly into a telecommunications device instead of relying upon separate accessory apparatus connecting a telecommunications device to a network.

It is an advantage of the present invention that it requires no user procedures to enable least-cost telecommunications routing.

It is an another advantage of the present invention that it can provide user options for prioritizing calls by time or cost.

It is an advantage of the present invention that information downloading from a provider to a subscriber is implemented automatically and silently.

It is another advantage of the present invention that it eliminates unnecessary delays in receiving new rate information.

It is another advantage of the present invention that it reduces telephone traffic to a rate provider.

It is another advantage of the present invention that rate information updates are based on availability of new rates and only subscribers affected by new rates are contacted, reducing network traffic.

It is a further advantage of the present invention that it eliminates telecommunications subscriber costs in retrieving rate updates not related to that subscriber's location.

It is a further advantage of the present invention that it can support modem or facsimile functions to facilitate data transfer over a telephone network.

Other objects, features and advantages of the present invention will become apparent upon consideration of the following explanation and the accompanying drawings, in which like reference designations represent like features throughout the drawings.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

Figure 1:
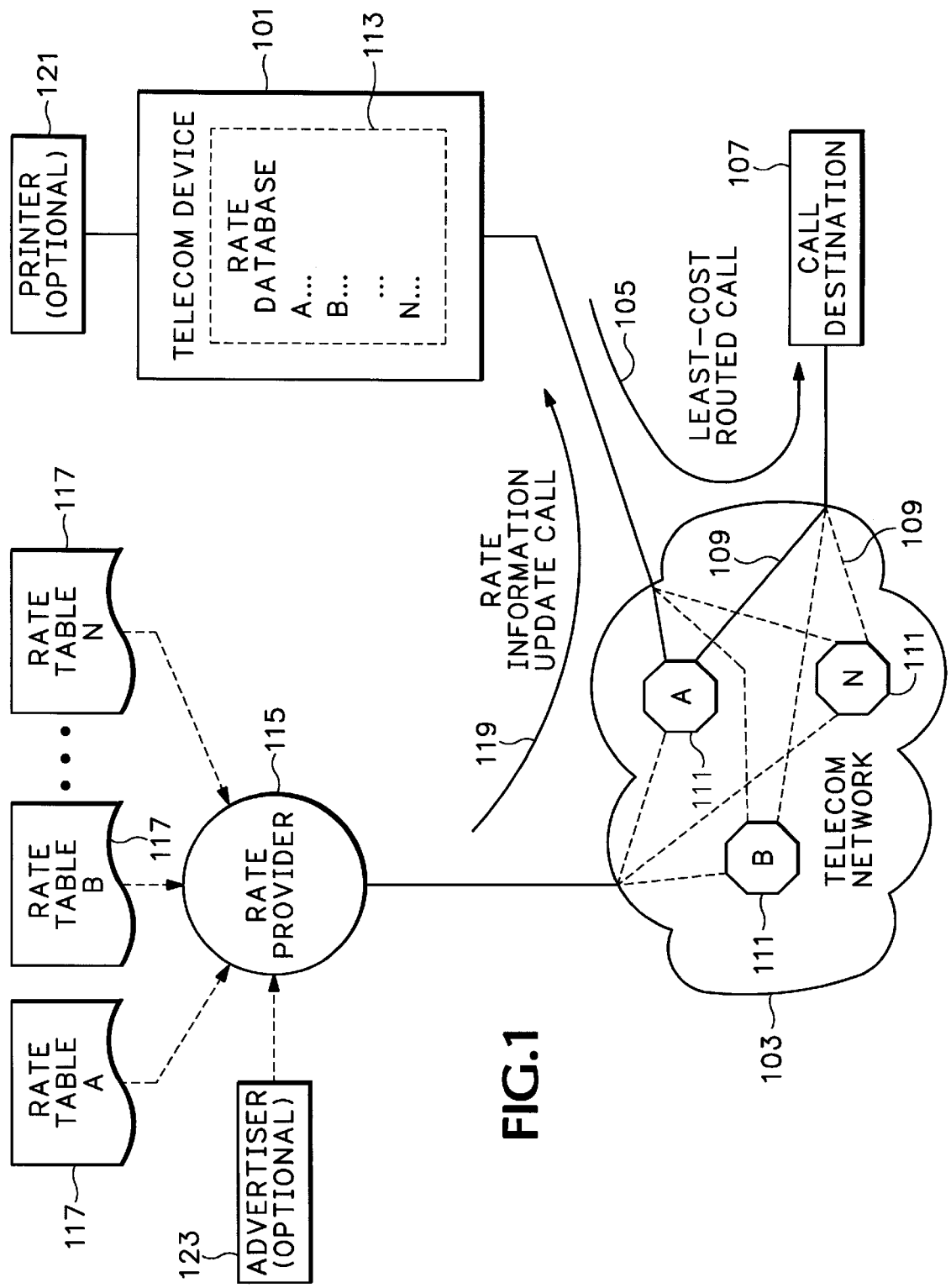
FIG. 1 is a schematic block diagram depicting a system overview in accordance with the present invention.

As shown in FIG. 1, in its basic aspects, the present invention provides a telecom device 101 (such as a telephone, facsimile machine, or computer with modem or telephone modules) connected to telecommunications networks 103 (such as those owned by common carrier telephone network entities—ATT™, Sprints™, MCI™ companies being the among the most widely recognized) and its methods of operation. The telecom device 101 is capable of routing transmissions originating from the device along a least-cost route 105 to a desired destination 107 along various communication paths 109 offered by different long distance service providers, or "carriers$A_{A-N}$," 111 supported on the telecom network 103. [In order to simplify the explanation of the present invention, the term "call" is to be understood as meaning any telecom transmission from the user to a destination 107 whether in the form of audible signals, data transmission, video signals, or the like as would be current to the state of the art.] The telecom device 101 makes the least-cost routing decision based on a stored database 113 within the device. The database 113 current information is periodically provided by a rate provider 115—such as a local telephone company—subscribed to by the user of the device 101 such that it contains the most up-to-date rate table 117 information provided by the carriers$_{A-N}$ 111 to the provider for all calls originating from the device 101. The database 113 that stores the rate table 117 information is organized in blocks—such as by region, area code, country code, and the like. Only blocks affected by a new or changed rate table 117 needs to be downloaded to the telecom device 101 at any given time, thereby reducing the downloading time for the provider 115. Unlike the prior art, the service subscriber having the telecom device 101 has to take no action to ensure least-cost routing is implemented when a call is placed from the telecom device 101.

Figure 2:
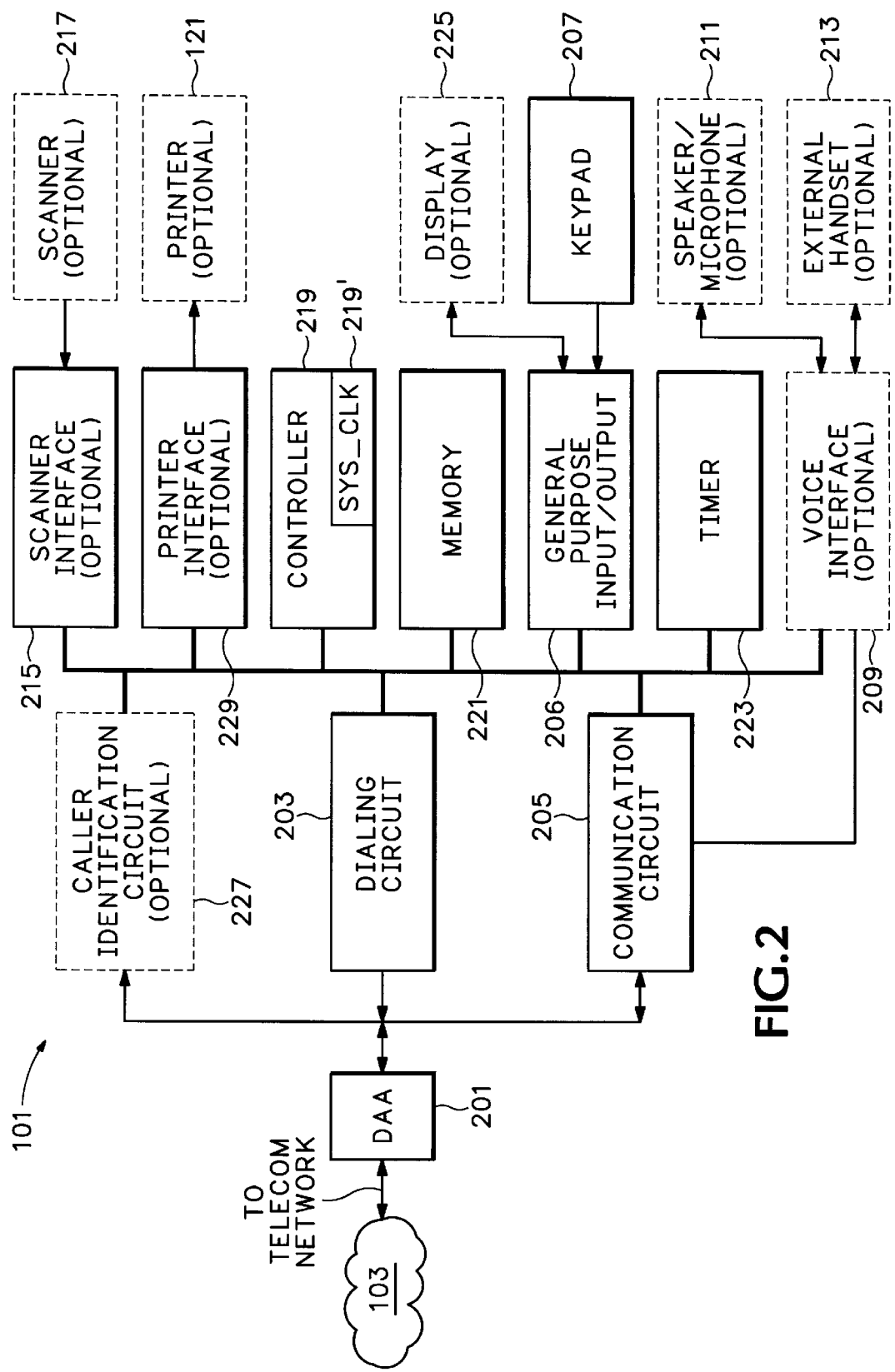
FIG. 2 is a schematic block diagram of a telecom device in accordance with the present invention as shown in FIG. 1.

FIG. 2 is a depiction of the telecom device 101 in accordance with the present invention. Basic telecom device components as would be known in the art are provided, namely:

- a telecom network 103 standard interface , such a data access arrangement ("DAA") 201 (also referred to in the art as a "line interface unit" or a "line condition unit") that matches line impedance, provides fault protection, blocks radio frequency signals, and the like;
- a dialing circuit 203;
- communication circuitry, modem circuitry, 205 general purpose input/output circuitry 206; and
- a keypad 207. Depending upon the type of telecom device 101—e.g., telephone, facsimile machine, or computer with modem—implemented in accordance with the present invention, other components may be "optional." However, as will be recognized by a person skilled in the art, one or more of the optional components become "necessary" based upon the particular implementation—as examples, voice interface circuitry 209 with an adjunct speaker/microphone 211 or external handset 213 for a telephone, or scanner interface 215 connected to a scanner 217 (internal or external) for a facsimile machine.

Every implementation further requires a central processing unit ("CPU") controller 219, such as a microprocessor, application specific integrated circuit ("ASIC"), or the like as would be commonly known in the art for operating programs implementing various telecommunications functions. A general purpose memory 221 is also provided, operating in conjunction with the controller 219. Such a controller 219 can also implement telecommunications accessory features, such as acting in combination with the memory 221 as a digital telephone answering machine. A timer 223 is included for delayed call placement, as will be explained hereinafter with respect to operational aspects of the present invention.

In accordance with a primary operational aspect of the present invention, the rate provider 115 (FIG. 1) initiates periodic updating 119 of database information $117_{A-N}$ without being prompted by the telecom device 101 or subscriber. It will be recognized that there are numerous types of changes to telecom system parameters that may affect a subscriber: rate changes, network changes, origination and destination area code changes, system synchronization data, and the like as would be apparent to a person skilled in the art. In order to simplify explanation of the present invention, rate change information will be used as an example of data to be downloaded to the device 101. This is not intended as any limitation on the scope of the invention, nor should any such intention be implied from this example.

Figure 3:
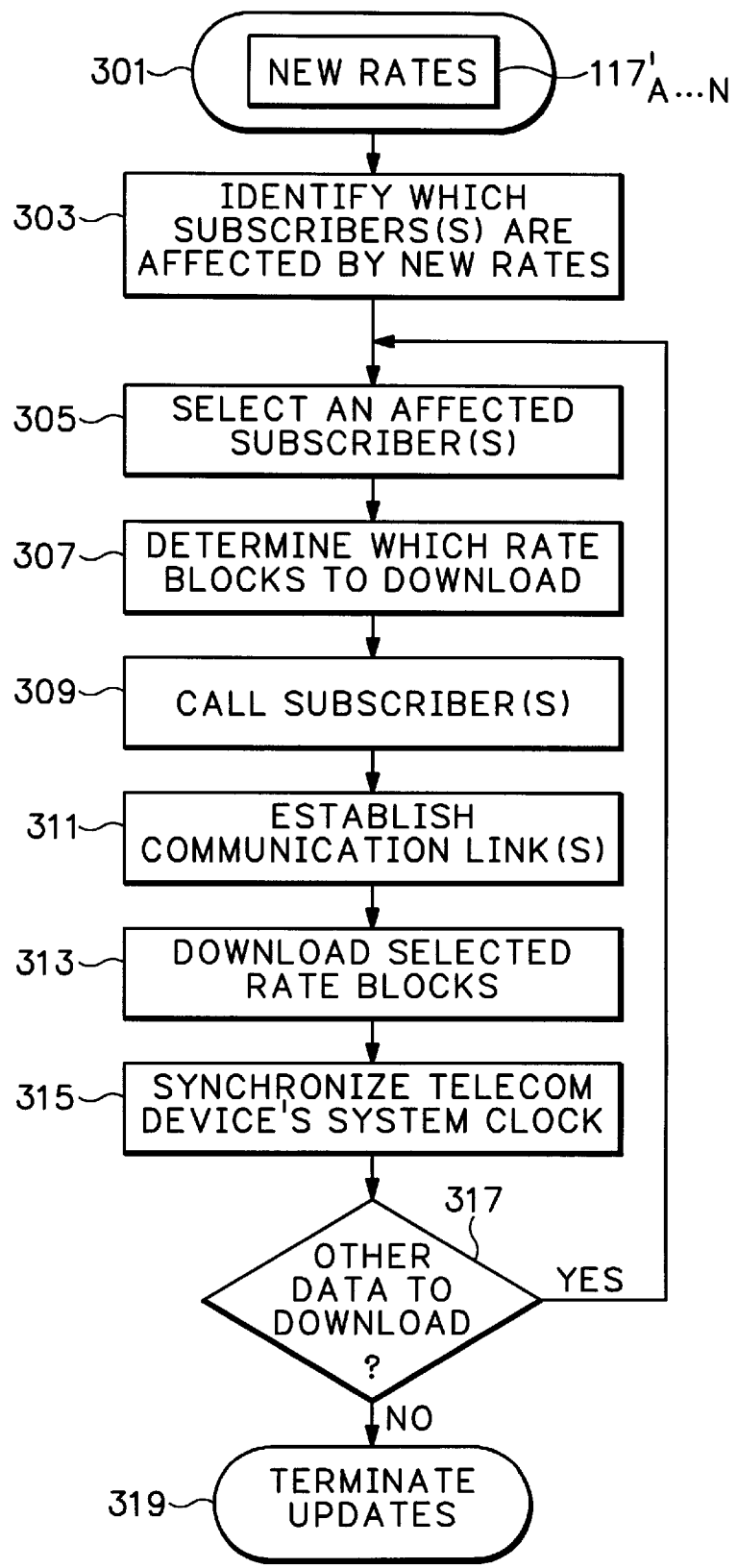
FIG. 3 is a flow chart depicting rate provider call origination to update telecom rate information in accordance with the present invention as shown in FIG. 1.

FIG. 3 shows the routine by which the rate provider 115 originates a call 119 to the telecom device 101 to update rate information 119 in the subscriber's telecom device database 113. Referring to FIGS. 1, 2, and 3, as carrier rates 117 change, new rates $117'_{A-N}$ are provided to the rate provider 115, by each carrier$_{A-N}$ 111 (as depicted by the phantom arrows connecting the rate tables 117 to the rate provider 115), step 301. Having the new rates $117'_{A-N}$ and based upon predetermined criteria, the rate provider 115 can identify which individual subscribers who have signed-up with the rate provider in order to benefit from least-cost call routing are affected by the rate changes from old rates to the newly published rates, step 303. For example, as a condition for using least-cost call routing, the subscriber having the telecom device 101 has given the provider 115 predetermined identification criteria; in other words, identifying information such as the device's area code, prefix-number, extension number, password(s), e-mail screen names or codes, and the like, which will directly relate the specific location of the device 101 to network 103 carrier 111 connection criteria. Therefore, the provider 115 can determine any and all subscribers affected by each and every rate change. Next, updating of affected subscribers is undertaken by the provider 115, steps 305–321. Note that contrary to the prior art, it is the rate provider 115 initiating the periodic updating of telecom device 101 rate database 113 information with new rates $117'_{A-N}$ without being prompted by the telecom device or subscriber.

The rate provider 115 selects an affected subscriber, step 305. Based on the subscriber's identifying criteria, the provider 115 determines which new rates $117'_{A-N}$ need to be downloaded to the selected subscriber, step 307. The rate provider 115 then places a call into the subscriber, step 309, and establishes a communication link, step 311. Once the communication link is established 311, the rate provider 115 downloads those selected new rates $117'_{A-N}$ that affect the least-cost routing service to that particular subscriber into the device memory 221 stored rate database 113. Note again, that the communication link 311 can also be used to synchronize the telecom device to the network, such as by resetting the system clock (usually part of the controller 219 microprocessor circuitry) 219' to the network clock, step 315. The rate provider then either loops back into the process to update other data changes, step 317 (YES-path), or terminates the subscriber updating routine (NO path), step 319. The next batch of affected subscribers having different update requirements is then processed by the rate provider 115, again without the need for subscriber intervention.

Figure 4:
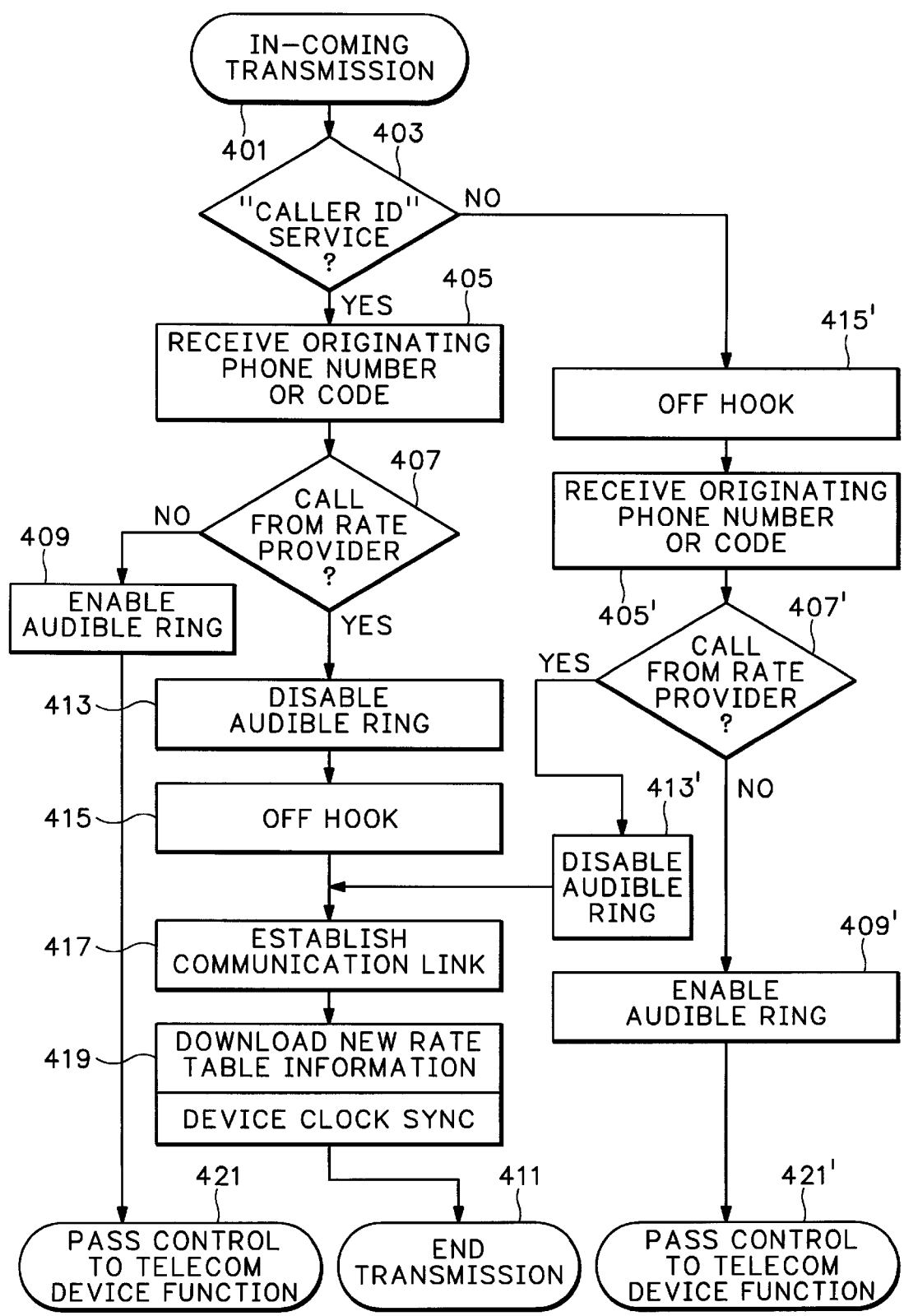
FIG. 4 is a flow chart depicting service subscriber reception of updated telecom rate information in accordance with the present invention as shown in FIG. 1.

The subscriber's telecom device 101 receives updated rate information or other downloadable data in accordance with the operational steps depicted in FIG. 4. The rate information update call 119 (FIG. 1) placed by the rate provider 115 is received by the telecom device 101, step 401. In many locales, the rate provider 115 supplies their subscribers with "Caller ID" system service, step 403; the in-coming line is routed through the provider supplied "Caller ID Box" (not shown) having a display that shows the originating caller number, or code, and name, so that the subscriber can screen incoming transmissions. Referring briefly to FIG. 2 also, a caller identification circuit 227 component of the telecom device 101 itself monitors all in-coming transmissions. Assuming the telecom device 101 has, or is connected to, a Caller ID Box (step 403, YES path), the originating caller identification information is received at the caller identification circuit 227, step 405, from the Caller ID Box. The controller 219 and memory 221 is pre-programmed with the rate providers caller identification information; therefore, a check as to whether the in-coming call is from the rate provider is made, step 407. If not (step 407, NO-path), an audible signal, or "ring," is enabled, step 409, and the subscriber—an answering machine, fax machine call pick-up, or the like telecom device 101 function—attends to the in-coming transmission 401, step 421. If the in-coming transmission 401 is via a caller identification circuit 227 and the call is from the rate provider 115 (step 407, YES-path), the audible signal is disabled, step 413, as the subscriber need take no action with respect to rate information update transmissions 119 from the rate provider. The controller 219 answers the in-coming transmission 401, step 415, establishing a communication link, step 417, via the communication circuitry 205. Once protocols are exchanged for the communication link, applicable new rate table information $117'_{A-N}$ for the particular subscriber contacted is downloaded into the telecom device memory 221 rate database 113 and the telecom device 101 clock and system is synchronized with the rate provider system, step 419. The system automatically terminates the call and process routine, step 411. When a subscriber or device 101 does not use a Caller ID service (step 403, NO-path), the device 101 answers the call, step 415', receives the originating ID number, step 405', and determines if the call 401 is from the rate provider 115, step 407'. If the call 401 is from the rate provider 115 (step 407', YES-path), the audible in-coming call signal is disabled, step 413', and a communication link is established, step 417, for the data download, step 419. When a subscriber or device 101 does not use the Caller ID service and the in-coming transmission 401 is not from the rate provider (step 407', NO-path), the audible in-coming call signal is enabled, step 409', and again the subscriber—an answering machine, fax machine call pick-up, or the like telecom device 101 function—attends to the in-coming transmission 401, step 421'.

Figure 5:
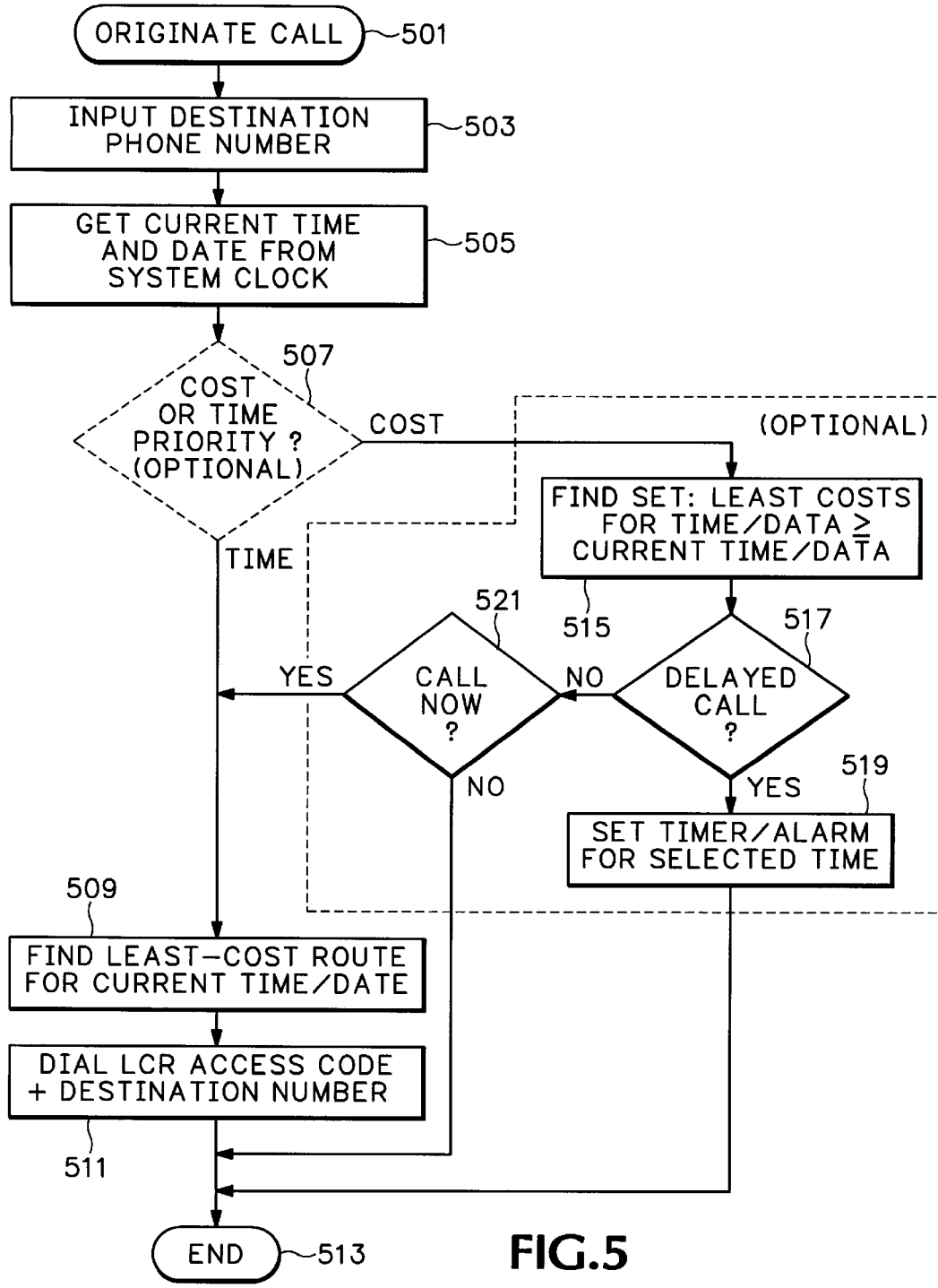
FIG. 5 is a flow chart depicting service subscriber origination of a least-cost routed call in accordance with the present invention as shown in FIG. 1.

In should again be recognized that fully automated, silent, rate information updates provided for the rate database 113 in the memory 221 of the telecom device 101 in accordance with the present invention, allow least-cost call routing by the subscriber on demand merely by placing a call, outgoing fax transmission, e-mail data transmission, or the like. The out-going call process is depicted by FIG. 5.

When a subscriber originates a call, step 501, using the telecom device 101 (FIGS. 1 and 2), the keypad 207 is used to input the call destination 107 number, or other telecom code, step 503. The current time and day/date are obtained from the system clock 219', step 505. A time-of-call versus cost-of-call priority option, step 507, can be provided for the subscriber at this juncture of the process. For example, if the telecom device 101 is a facsimile machine, the user may be broadcasting a fax to a number of destinations where the time of receipt is not critical; therefore, the lowest cost is desirable. The controller 219 can be programmed to display 225 the TIME-versus-COST path option 507 decision to the subscriber who will use the keypad 207 to indicate which path of the process to implement. If the TIME option is selected, or if a simplified, less sophisticated version of the telecom device 101 not having the option 507 is in use, the rate database 113 is accessed, step 509, to find the least-cost routing for the current time and day/date. The device 101 dials the leastcost route network 103 access code and call destination number, step 511, placing the call over the currently available least-cost route 105. At the end of the transmission, the call is terminated as usual, step 513. When the TIME-versus-COST path option 507 is available, and the COST option is selected, the controller determines a set of least-cost routes for up-coming times and day/dates, step 515, displaying 225 the set for the device 101 user. The user then decides, step 517, whether it is beneficial to delay the call, step 517. If a decision is made to delay the call (step 517, YES-path), the keypad 207 can be used to select an appropriate timer 223 setting, step 519, and end the procedure, step 513. If it is not to the subscriber's desires to delay the call—e.g., there exist over the set only minimal cost savings over the displayed figures for time/date=current time/date—(step 517, NO-path), the device 101 provides an option, step 521, and the call is either placed (step 521, YES-path), steps 509, 511, and 513, or the procedure terminated (step 521, NO-path), step 513. In a preferred embodiment, the device 101 can be provided with features for programming or automating the path option 507 such that the subscriber can preset selection (e.g., for repeated destination calls where the option is always going to be preferred to be the same) or "one-touch" selection between options.

The telecom device 101 of the present invention can be provided with another option for the receipt of messages without the need for subscriber intervention. Looking to FIG. 1, the subscriber may be interested in regularly receiving information from particular individuals or organizations, hereinafter "advertiser" 123. The device 101 is programmed via the caller identification circuitry 227 to acknowledge and receive in-coming transmissions from desired originators in the same manner as rate information update calls 119 are silently received as shown in FIG. 4. The telecom device 101 can use the memory 221 and display 225 or an optional hard copy apparatus, e.g., a printer interface/output port 229 or, for a fax machine, a built-in inkjet printer, 121 to obtain the desired information.

In automated systems, it is possible to have errors caused by disruption in power supplies, self-check diagnostics, memory errors, and the like. With a display 225 feature, or other visible or audible signaling, it is possible to have an error indicator to signal device error conditions due to problems such as a corrupted rate table, or failed update attempt. This indicator will notify the subscriber to initiate a procedure; e.g., a call back to the rate provider to remedy a failed download attempt, a system reset, or the like.

Thus, the present invention provides a method and apparatus for telecommunications having automatic network adaptations and silent mode operations. Least-cost routing upgrades and transmissions or other desirable incoming transmissions are essentially end-user transparent operations.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents.

What is claimed is:

1. A telecommunications system for a telecommunications network including a plurality of carriers connected to a plurality of subscriber telecommunications devices and apparatus for determining carrier preference and automatically scheduling, each of said devices including means for establishing and using network system parameter information and means for identifying in-coming transmission sources; connected to each of the carriers, central means for controlling network system parameters, for receiving periodically changing out-going transmission rate data from each of said carriers, for determining which of the plurality of devices is affected by changing network system parameter information, for establishing contact silently with system parameter change affected devices through said means for identifying in-coming transmission sources, and for downloading to the means for establishing and using network system parameter information of a currently contacted device at least changes in system parameter information affecting the currently contacted affected device; and an out-going transmission rate database means for determining carrier preference when placing an out-going transmission and automatically scheduling least-cost routing among the plurality of carriers, wherein said system parameter information includes current and future out-going transmission rate data, the system comprising:

each of said devices having a system clock and said central means including means for synchronizing said system clock to network clock most current network system parameters and said periodically changing out-going transmission rate data from each of said carriers.

2. The system as set forth in claim 1, each of said devices further comprising:

means for comparing current out-going transmission rate costs with at least one future out-going transmission rate costs, and means for selecting between placing an out-going transmission based on current out-going transmission rate costs or a future out-going transmission rate cost.

3. The system as set forth in claim 1, further comprising:

means for transmitting subscriber-based predetermined data to said central means;

said central means further including means for identifying devices subscribing to transmissions of said subscriber-based predetermined data, and for transmitting said subscriber-based predetermined data only to individual devices subscribing to subscriber-based predetermined data; and each of said devices having means for identifying in-coming transmissions from said central means of said subscriber-based predetermined data, and means for displaying said subscriber-based predetermined data on-demand.

* * * * *